Aug. 19, 1924.
K. R. MANVILLE
1,505,480
FLEXIBLE FRICTION DRIVE FOR GENERATORS AND THE LIKE
Filed Jan. 17, 1923
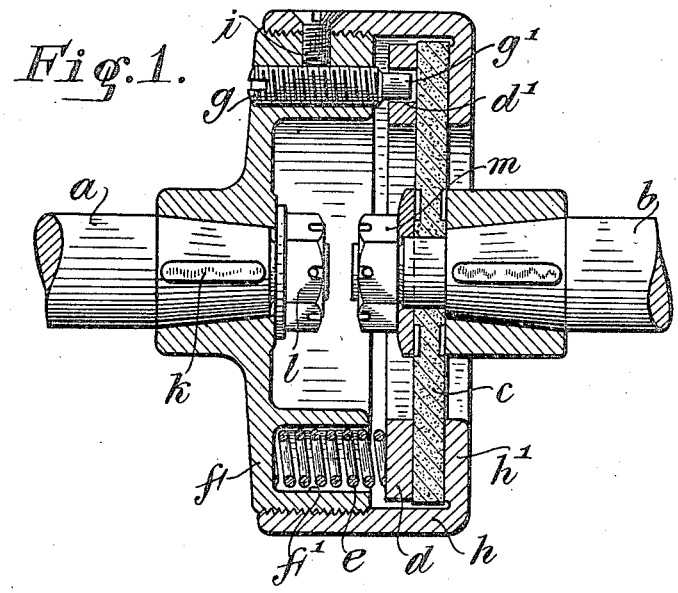
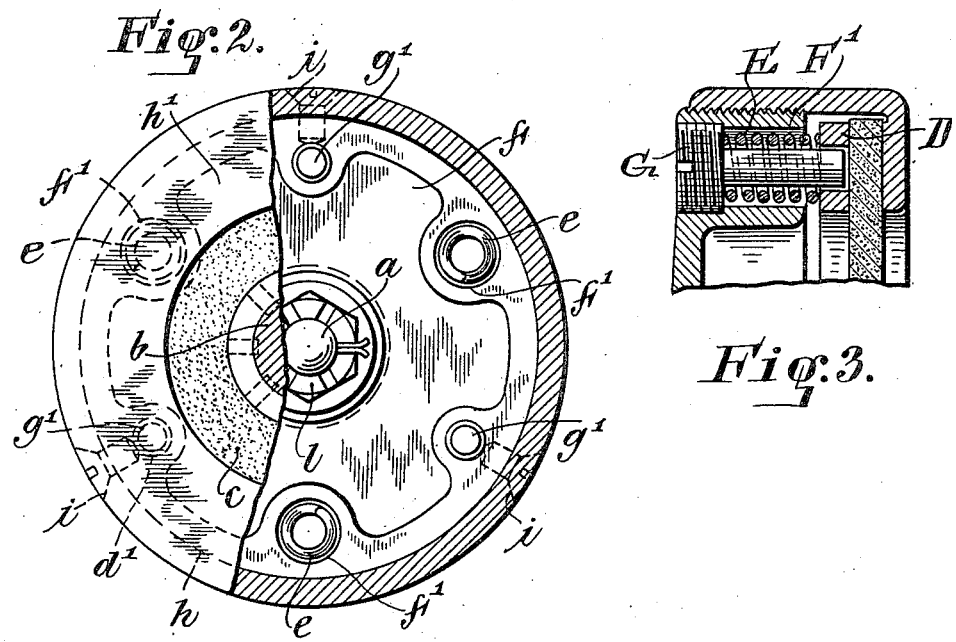
Inventor
Keith R. Manville
By his Attorneys
Redding & Greeley Patented Aug. 19, 1924.

1,505,480

UNITED STATES PATENT OFFICE.

KEITH R. MANVILLE, OF BROOKLYN, NEW YORK, ASSIGNOR TO INTERNATIONAL MOTOR COMPANY, OF NEW YORK, N. Y., A CORPORATION OF DELAWARE.

FLEXIBLE FRICTION DRIVE FOR GENERATORS AND THE LIKE.

Application filed January 17, 1923. Serial No. 613,117.

*To all whom it may concern:*

Be it known that I, KEITH R. MANVILLE, a citizen of the United States, residing in the borough of Brooklyn of the city of New York, in the State of New York, have invented certain new and useful Improvements in Flexible Friction Drives for Generators and the like, of which the following is a specification, reference being had to the accompanying drawings, forming a part hereof.

This invention relates to a simple and efficient driving connection between shaft sections whereby a degree of slippage is afforded to protect the sections against overload at the time of sudden changes in speed of the other section and to afford through its inherent construction capacity for universal movement of limited extent between the shaft sections. In one of its most practical applications the connection may be interposed in the drive for the generator of an internal combustion engine in which case it is interposed at some point between the crank shaft of the motor and the armature of the generator. Sudden changes in speed of the crank shaft of an internal combustion motor are very frequent and the great inertia of the armature of the generator prevents this unit from readily adapting itself to such abrupt changes in speed with a result that there is always present the danger of breakage or distortion of some of the connected parts and the connected parts have to be designed of sufficient strength to take care of such overloads. In accordance with the present invention it is proposed to provide a flexible friction drive one unit of which is adapted to afford a degree of slippage sufficient to protect the connected parts against overload and also afford some degree of universal movement between the connected shaft sections to facilitate assembling and disassembling and insure an efficient transmission of power. The improved connection generally speaking includes a flexible driving friction disk carried by one of the shaft sections and adapted to be frictionally engaged with the other shaft section through some form of yielding presser plate. The friction disk employed is of such form and so disposed between the shaft sections as also provides for universal movement therewith. Another feature of the invention consists in the provision of a wholly enclosed connection as and for the purposes described in which the parts are substantially protected against the entry of foreign matter. The invention will be described in greater particularity with reference to the illustrated embodiments in the accompanying drawings wherein:

Figure 1 is a view in vertical section through a driving connection between two shaft sections embodying the improvements.

Figure 2 is a view partly in elevation and partly in section through the connection shown in Figure 1.

Figure 3 is a fragmentary detail view in section of a modified construction.

It may be assumed for convenience in this description that the shaft section $a$ is the drive shaft and the shaft section $b$ the driven shaft, the section $a$ being rotated, for instance, from the crank shaft of an internal combustion engine and the shaft section $b$, for instance, being connected directly with the armature of the generator for the motor. Sudden changes in speed to which the crank shaft of an internal combustion engine is subjected are opposed by the relatively great resistance offered by the generator and it may be said that the overloads resulting not only tend to injure or break the connected parts but must be met in the design by giving added strength thereto. In accordance with the present invention provision is made for some degree of slippage between the shaft sections $a$ and $b$ whereby overloads are taken care of in such a way as to eliminate danger of injury. In the embodiment of the connection illustrated in Figure 1 a flexible friction disk $c$ is shown as secured to one of the shaft sections $b$ and this disk is frictionally engaged with the other shaft section $a$ through engaging faces of relatively large superficial bearing area, including the face of a presser plate $d$ which is normally held yieldingly against the disk $c$ as by springs $e$. The shaft section $a$ may have secured thereon a circular coupling plate $f$ in which are disposed the springs $e$ in desired number and relation to press the plate $d$ against one side of the friction disk $c$. These springs $e$ may be seated in recesses $f'$ formed in the face of the circular coupling plate $f$. This plate $f$ may also be used to carry guide studs $g$ of any desired number and disposition which may be threaded through the plate and be formed with plain ends $g'$ adapted to rest in openings $d'$ through the presser plate and thereby guide the presser plate in its axial movements. The periphery of the plate $f$ is threaded for engagement with a threaded cap $h$ having an annular flange $h'$ adapted to back up the friction disk $c$ and serve as a seat therefor against the pressure of the presser plate $d$ on its opposite face. The cap $h$ may be finally locked in desired relation to the other parts described by means of set screws $i$ passing therethrough into the circular plate $f$ and these set screws, if desired, may serve the additional function of locking the guide studs $g$ in predetermined position.

The action and advantages of the improved connection will now be described. In the initial assembly the circular plate $f$ will first be secured on the shaft $a$ as by the splines $k$ and locknut $l$ with the guide studs $g$ turned in to approximately the desired extent. The cap $h$ may then be passed onto the shaft $b$ and the friction disk $c$ secured thereto as by any suitable devices including a locknut $m$. With the springs $e$ in their pockets and the presser plate $d$ in proper relation to the friction disk $c$ the cap $h$ may be threaded onto the circular plate $f$ until the desired degree of friction is obtained between the disk $c$ and its seat $h'$ as determined by the pressure of the spring $e$ on the presser plate $d$. The guide studs $g$ may also be adjusted to meet the conditions of assembly so that the plate $d$ is guided properly in its movements and the set screws $i$ may then be turned in to lock the studs $g$, respectively, and also lock the cap $h$. During this process of assembling it will be understood that the flexible friction disk $c$ affords a sufficient degree of universal movement to facilitate the assembly and that with the relation of parts described the same degree of universal movement as between the shafts $a$, $b$, will be afforded in use by this disk. Further, the parts when finally united constitute a completely enclosed housing for the plate $d$ and the springs $e$ and exclude foreign matter from within. The universal action of the connection is afforded by providing a seat $h'$ for the disk at its periphery so that the disk is not backed up at every point and by forming the presser plate $d$ as a ring substantially symmetrical with the seat $h'$ so that the periphery of the slippage disk $c$ may twist with respect to its axis. Further, this construction taking into account the engagement of the presser plate $d$ with the guide studs $g$ also provides for the transmission of driving force from the shaft $a$ through both the presser plate $d$ and the backing seat $h'$. The transmission of power is therefore efficient and certain being effected through bearing faces of relatively large superficial area and yet the necessary degree of slippage is permitted in case of overload.

In the modified construction shown in Figure 3 similar parts are employed except that the guide studs G for the presser plate D pass through the recesses F' for the springs E and are disposed concentrically with respect to said springs, respectively. Otherwise, the same action and advantages heretofore noted are realized.

Changes in details of construction and matters of design and arrangement may be made by one skilled in the art without departing from the spirit of the invention provided the objects of the invention are realized by devices which are equivalent mechanically.

What I claim is:

1. A coupling of the character described including a circular coupling plate carried on one shaft, a flexible disk carried on the other shaft, a coupling cap having a flange constituting a seat for the flexible disk and adapted to be threaded onto the circular coupling plate, the cap and coupling plate constituting an enclosed housing, a presser plate disposed within the housing thus formed to maintain the friction disk on its seat and springs disposed within said housing to co-operate with the presser plate.

2. A coupling of the character described including a circular coupling plate carried on one shaft, a flexible disk carried on the other shaft, a coupling cap having a flange constituting a seat for the flexible disk and adapted to be threaded onto the circular coupling plate, the cap and coupling plate constituting an enclosed housing, a presser plate disposed within the housing thus formed to maintain the friction disk on its seat, springs disposed within said housing to co-operate with the presser plate, adjustable guide studs passing through the circular coupling plate and co-operating with the presser plate to guide it in its movements and set screws to lock the cap in predetermined position and also lock the guide studs, respectively.

This specification signed this 15th day of January, A. D. 1923.

KEITH R. MANVILLE.